United States Patent [19]

Nojima et al.

[11] Patent Number: 5,972,821
[45] Date of Patent: *Oct. 26, 1999

[54] CATALYSTS FOR CLEANING EXHAUST GASES

[75] Inventors: Shigeru Nojima; Kouzo Iida, both of Hiroshima, Japan

[73] Assignee: Mitsubishi Jukogyo Kabushiki Kaisha, Tokyo, Japan

[ * ] Notice: This patent is subject to a terminal disclaimer.

[21] Appl. No.: 08/942,353

[22] Filed: Oct. 1, 1997

Related U.S. Application Data

[63] Continuation of application No. 08/514,415, Aug. 11, 1995, Pat. No. 5,710,084.

[30] Foreign Application Priority Data

Aug. 12, 1994 [JP] Japan .................................. 6-190488

[51] Int. Cl.$^6$ ................................................... B01J 29/068
[52] U.S. Cl. ................................ 502/66; 502/64; 502/71; 502/74; 502/77
[58] Field of Search .................................. 502/64, 66, 71, 502/74, 77

[56] References Cited

U.S. PATENT DOCUMENTS

| | | | |
|---|---|---|---|
| 5,164,350 | 11/1992 | Abe et al. ................................ | 502/66 |
| 5,489,561 | 2/1996 | Iwakuni et al. ........................... | 502/66 |
| 5,677,254 | 10/1997 | Nojima et al. ............................ | 502/65 |
| 5,710,084 | 1/1998 | Nojima et al. ............................ | 502/66 |

*Primary Examiner*—Thomas Dunn
*Attorney, Agent, or Firm*—Morrision & Foerster

[57] ABSTRACT

A catalyst for cleaning exhaust gases has a first catalyst layer having as an active metal on an elemental support at least one noble metal selected from the group consisting of platinum, rhodium and palladium and a second catalyst layer having iridium as an active metal which is provided as a overlayer on the first catalyst layer.

38 Claims, No Drawings

CATALYSTS FOR CLEANING EXHAUST GASES

This application is a continuation of application Ser. No. 08/514,415, filed Aug. 11, 1995, now U.S. Pat. No. 5,710,084.

FIELD OF THE INVENTION AND RELATED ART STATEMENT

The present invention relates to a catalyst for cleaning exhaust gases containing nitrogen oxides (hereinafter abbreviated as NO$x$), carbon monoxide (CO) and hydrocarbons (HC).

In the automobile exhaust gas disposal, NO$x$ is generally cleaned within a very limited region around the logical air/fuel ratio by a catalyst while utilizing CO and HC contained in the exhaust gas. However, in cases of exhaust gas disposal of lean burn gasoline engines and diesel engines, denitration is prevented completely when using a conventional catalyst because of an excessively large amount of oxygen in the exhaust gas. Recently, crystalline silicate catalysts containing cobalt or copper have been proposed as catalysts capable of cleaning NO$x$ even in an excessive oxygen atmosphere.

However, these catalysts suffer problems of deterioration due to heat, water vapor and sulfur dioxide in the exhaust gas, although they exhibit satisfactory performance at the initial stage of the reaction.

We have already found after making much effort to obtain a catalyst capable of overcoming the problems mentioned above that a catalyst on which iridium is supported is a highly active and durable catalyst (Japanese Patent Application Numbers H5-26369, H5-100698, H5-228382 and H5-287986). Nevertheless, the catalyst supporting iridium provides a denitration rate which is not sufficient when applied to a practical car driving because of the limited cleaning ability against CO and HC at a low exhaust gas temperature of 300° C. or lower.

OBJECT AND SUMMARY OF THE INVENTION

An objective of the present invention is to provide a catalyst for cleaning exhaust gases which exhibits denitration performance not only at a high temperature but also at a temperature as low as 300° C. or lower.

An aspect of the present invention is a catalyst for cleaning exhaust gases comprising a first catalyst layer having as an active metal on an elemental support at least one noble metal selected from the group consisting of platinum, rhodium and palladium on which a second catalyst layer having iridium as an active metal is provided as a overlayer.

The catalyst for cleaning exhaust gases according to the present invention is a highly durable and stable catalyst, which can be utilized as an exhaust gas cleaning catalyst for a lean burn gasoline engine as well as a diesel engine.

DETAILED DESCRIPTION OF PREFERRED EMBODIMENTS

A carrier for carrying iridium as an active metal in the second layer catalyst according to the present invention is a crystalline silicate which has a X-ray diffraction pattern shown in Table A in the specification and which is represented by the formula in the molar ratio as dehydrated: $(1\pm 0.8)R_2O \cdot [aM_2O_3 \cdot bM'O \cdot cAl_2O_3] \cdot ySiO_2$ wherein R denotes an alkaline metal ion and/or hydrogen ion, M denotes at least one elemental ion selected from the group consisting of VIII group elements, rare earth element, titanium, vanadium, chromium, niobium, antimony or gallium, M' denotes an alkaline earth metal ion of magnesium, calcium, strontium or barium, $a>0$, $20>b\geq 0$, $a+c=1$ and $3000>y>11$.

TABLE A

| Lattice spacing (interstitial distance) (d value) | Relative strength |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong
S: Strong
M: Medium
W: Weak
(X-ray source: Cu Kα)

A preferable example of the carrier for carrying iridium as an active metal in the second catalyst layer according to the present invention other than the silicate mentioned above is one or more substances selected from the group consisting of simple oxides such as γ-alumina, θ-alumina, silica, zirconia and titania, complex oxides such as alumina•zirconia, zirconia•titania and alumina•titania, a solid strong acid sulfate-containing zirconia (obtained by immersing zirconium hydroxide in 1N sulfuric acid for about 1 hour at room temperature followed by filtration, drying and sintering) as well as a series of zeolites such as zeolite type Y, silicalite (a zeolite having a pentasil structure cosisting only of Si and O), zeolite type A and mordenite.

A carrier for carrying as the first layer catalyst of an active metal, which is at least one noble metal selected from the group consisting of platinum, rhodium and palladium, according to the present invention may be any of those which can be used as a carrier for a standard catalyst, and γ-alumina is generally preferred.

The thickness of the coating of the first catalyst layer on the elemental support is within the range from 1 to 300 μm, preferably 5 to 100 μm, and that of the second catalyst layer is within the range from 1 to 300 μm, preferably 3 to 200 μm. At least one noble metal selected as the first layer catalyst from the group consisting of platinum, rhodium, and palladium and iridium as the second layer catalyst are supported on respective carriers. preferably by means of an ion exchange method or an impregnation method. The noble metal of the first catalyst layer is coated in an amount of 0.05 to 5 g, and the iridium of the second catalyst layer is coated in an amount of 0.03 to 10 g, both per 1 L of the elemental support (generally a coagulate support but any heat-resistant ceramic is acceptable).

In the catalyst according to the present invention, for the purpose of achieving the denitrating activity covering a wider range of low temperature, the catalyst layer carrying at least one noble metal selected from the group consisting of platinum, rhodium and palladium is provided beneath the layer carrying iridium.

Thus, the first catalyst layer having as an active metal at least one noble metal selected from the group consisting of platinum, rhodium and pallatium is provided on the elemental support, and then the second catalyst layer having iridium as an active metal is provided as a overlayer to form a multilayer catalyst.

When applied to an exhaust gas at a temperature of about 250° C. or higher, no denitration can be effected only by the second layer iridium-carrying catalyst because there is no burning of CO or HC. However, in the case where the catalyst carrying at least one noble metal selected from the group consisting of platinum, rhodium and palladium is provided as the first layer catalyst, sufficient burning of CO and HC at 250° C. is effected, resulting in the increase in the temperature of the second layer iridium-carrying catalyst up to the active temperature range, whereby exhibiting the denitration performance.

In addition, the denitration performance can be obtained continuously from the exhaust gas temperature ranging from 200° C. to a higher temperature since platinum, rhodium and palladium can exhibit denitration activity in association with the burning of CO and HC at a temperature as low as 200 to 300° C. (Japanese Patent Application Number H4-230700). On the other hand, at a high exhaust gas temperature of 400° C. or higher, the performance of the second iridium-carrying catalyst layer becomes predominant, and the first catalyst layer scarcely affects the reaction, thereby maintaining the high performance.

The exhaust gas containing NOx, CO and HC is cleaned by a catalyst which carries iridium as the second layer catalyst in the reactions represented by the formulae shown below.

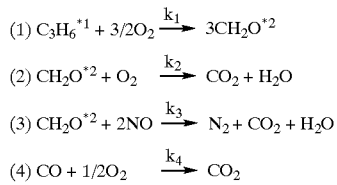

*1)$C_3H_6$ is used as a representative of hydrocarbons (HC).
*2)$CH_2O$ is used as a representative of oxygen-containing hydrocarbons.

In the reactions shown above, formula (1) shows the activation of HC, formula (2) shows the burning of HC, formula (3) shows the denitration, and formula (4) shows the burning of CO.

EXAMPLE 1
* Preparation of Catalyst 5616 g of water glass #1 ($SiO_2$: 30%) was dissolved in 5429 g of water to yield solution A. Separately, 718.9 g of aluminum sulfate, 110 g of ferric chloride, 47.2 g of calcium acetate, 262 g of sodium chloride and 2020 g of concentrated hydrochloric acid were dissolved together in 4175 g of water to yield solution B. Solution A and solution B were mixed and stirred thoroughly to yield a slurry at pH8. These two solutions were fed keeping the pH as constant as possble at 8. Namely, solution A was fed at 11045/30=368 g/min., whereas solution B was fed at 7333/30=244 g/min. so that the pH was kept at 8. The slurry thus obtained was charged in a 20 L autoclave, to which 500 g of tetrapropyl ammonium bromide was added and the mixture was subjected to hydrothermal synthesis at 160° C. for 72 hours. After synthesis, washing with water, drying and sintering for 3 hours at 500° C., crystalline silicate 1 was obtained. Crystalline silicate 1 thus obtained is represented in a molar ratio (excluding crystal water) by the formula shown below and has the crystal structure characterized by the X-ray diffraction pattern shown in Table A.

$0.5Na_2O.0.5H_2O.[0.8Al_2O_3.0.2Fe_2O_3.0.25CaO].25SiO_2$

Crystalline silicate 1 obtained above was subjected to $NH_4$ ion exchange by stirring with 4N aqueous solution of $NH_4Cl$ at 40° C. for 3 hours. After the ion exchange, the silicate was washed and dried at 100° C.. for 24 hours and sintered at 400° C. for 3 hours to obtain crystalline silicate 1 of type H.

100 g of γ-alumina was immersed in an aqueous solution of chloro platinic acid ($H_2PtCl_6.6H_2O$: 2.66 g/100 cc) and kept at 120° C. to evaporate to dryness, and then purged with nitrogen for 3 hours at 500° C. to yield powder catalyst 1.

On the other hand, 100 g of crystalline silicate 1 was immersed in an aquelous solution of chloroiridic acid ($H_2IrCl_6$: 2.1 g/100 cc) and kept at 120° C. to evaporate to dryness, and then purged with nitrogen for 3 hours at 500° C. to yield powder catalyst 1'.

* Preparation of Honeycomb Catalyst

Then, to mixtures of 100 parts each of powder catalysts 1 and 1', 3 parts of alumina sol and 55 parts of silica sol (20% $SiO_2$) as binders and 200 parts of water were added, and the mixtures were stirred thoroughly to yield slurries of catalysts 1 and 1' for wash coats. Then a monolith support for coagulate (400-cell lattice/inch$^2$) was immersed in the slurry of powder catalyst 1, and taken out. After blowing excessive slurry off, the support was dried at 200° C. By this procedure 100 g/L of powder catalyst 1 (first layer catalyst) was coated on the substrate.

Then the support coating with powder catalyst 1 was immersed in the slurry of powder catalyst 1', and taken out. After blowing excessive slurry off, the support was dried at 200° C. By this procedure 100 g/L of powder catalyst 1' (second layer catalyst) was coated.

The catalyst thus obtained was designated as honeycomb catalyst 1.

EXAMPLE 2
* Preparation of Catalyst

Except for adding cobalt chloride, ruthenium chloride, rhodium chloride, lanthanum chloride, cerium chloride, titanium chloride, vanadium chloride, chromium chloride, antimony chloride, gallium chloride and niobium chloride in molar amounts as oxides similar to that of $Fe_2O_3$ instead of ferric chloride used in the synthesis of crystalline silicate 1 in Example 1, the procedure similar to that employed for crystalline silicate 1 was conducted to obtain crystalline silicates 2 to 12. The crystal structures of these crystalline silicates as X-ray diffraction patterns are characterized as shown above in Table A, with the compositions being represented by the following formula in molar ratios of the oxides (dehydrated forms):

$0.5Na_2O.0.5H_2O.(0.2M_2O_3.0.8Al_2O_3.0.25CaO).25SiO_2$, wherein M denotes Co, Ru, Rh, La, Ce, Ti, V, Cr, Sb, Ga or Nb.

Except for adding magnesium acetate, strontium acetate and barium acetate each in the molar amount as an oxide similar to that of CaO instead of calcium acetate used in the synthesis of crystalline silicate 1 in Example 1, the procedure similar to that employed for crystalline silicate 1 was conducted to obtain crystalline silicates 13 to 15. The crystal structures of these crystalline silicates as X-ray diffraction patterns were shown above in Table A, with the compositions being represented by the following formula in molar ratios of the oxides (dehydrated forms):

$0.5Na_2O.0.5H_2O.(0.2Fe_2O_3.0.8Al_2O_3.0.25MeO).25SiO_2$, wherein Me denotes Mg, Sr or Ba.

Using crystalline silicates 2 to 15 and the procedure similar to that employed in Example 1, silicates of type H were obtained and then immersed in the aqueous solution of chloroiridic acid to obtain powder catalysts 2' to 15'.

* Preparation of Honeycomb Catalysts

Each of powder catalysts 2' to 15' was processed similarly as in Example 1 to form slurries, which were used as the second layer catalyst and coated instead of the slurry of powder catalyst 1' at the rate of 100 g/L onto the surface of the support which had already been coated with powder catalyst 1. The catalysts thus obtained were designated as honeycomb catalysts 2 to 15.

EXAMPLE 3

$\gamma$-$Al_2O_3$, $\theta$-$Al_2O_3$, $SiO_2$, $ZrO_2$, $TiO_2$, $Al_2O_3.ZrO_2$ (1:1 by weight), $ZrO_2.TiO_2$ (1:1 by weight), $Al_2O_3.TiO_2$ (1:1 by weight), $SO_4/ZrO_2$, zeolite of type Y, silicalite, zeolite of type A, and mordenite instead of crystalline silicate 1 used in Example 1 were immersed in and impregnated with the aqueous solution of chloroiridic acid solution similarly as in Example 1 to obtain powder catalysts 16' to 28'.

Then, each of powder catalysts 16' to 28' was processed similarly as in Example 1 to form slurries, which were used as the second layer catalyst and coated instead of the slurry of powder catalyst 1' at the rate of 100 g/L onto the surface of the support which had already been coated with powder catalyst 1. The catalysts thus obtained were designated as honeycomb catalysts 16 to 28.

EXAMPLE 4

Instead of the aqueous solution of chloroplatinic acid used in the preparation of powder catalyst 1 in Example 1, 100 g of $\gamma$-alumina was immersed in each of aqueous solutions of rhodium chloride ($RhCl_3.3H_2O$: 1.45 g/100 cc) or palladium chloride ($PdCl_2.2H_2O$: 1.10 g/100 cc), mixed aqueous solutions of chloroplatinic acid•rhodium chloride ($H_2PtCl_6.6H_2O$: 1.33 g+$RhCl_3.3H_2O$: 0.73 g/100 cc), mixed aqueous solutions of chloroplatinic acid•palladium chloride ($H_2PtCl_6.6H_2O$: 1.33 g+$PdCl_2.2H_2O$: 0.55 g/100 cc) and mixed aqueous solutions of chloroplatinic acid•rhodium chloride•palladium chloride ($H_2PtCl_6.6H_2O$: 0.89 g+$RhCl_3.3H_2O$: 0.48 g+$PdCl_2.2H_2O$: 0.37 g/100 cc), kept at 120° C., evaporated to dryness, and then purged with nitrogen for 3 hours at 500° C. to obtain powder catalysts 2 to 6

Then, each of powder catalysts 2 to 6 was processed similarly as in Example 1 to form slurries, which were used as the first layer catalyst and coated instead of powder catalyst 1 at the rate of 100 g/L onto the surface of the support in a manner similar to that employed in Example 1, and then powder catalyst 1' was coated as an overlayer similarly as in Example 1. The catalysts thus obtained were designated as honeycomb catalysts 29 to 33.

EXAMPLE 5

Crystalline silicate 1 of type H in Example 1 was employed instead of $\gamma$-alumina for powder catalyst 1 in Example 1 and immersed in the aqueous solution of chloroplatinic acid similarly as in Example 1 to obtain powder catalyst 7. Powder catalyst 7 as the first layer catalyst and powder catalyst 1' as the second layer catalyst were processed similarly as in Example 1 to obtain honeycomb catalyst 34.

COMPARATIVE EXAMPLE 1

Only powder catalyst 1 was coated onto a honeycomb elemental support at the rate of 200 g/L similarly as in Example 1 to obtain honeycomb catalyst 35.

Compositions of the inventive and comparative catalysts described above are shown in Table B.

TABLE B

| | 1st layer catalyst powder | | | 2nd layer catalyst powder | | |
|---|---|---|---|---|---|---|
| Honeycomb catalyst | No | Active metal | Carrier composition. | No | Active metal | Carrier composition |
| 1 | 1 | Pt | $\gamma$-$Al_2O_3$ | 1' | Ir | $0.5Na_2O.0.5H_2O$ ($0.2Fe_2O_3.0.8Al_2O_3.0.25CaO$) |
| 2 | 1 | Pt | $\gamma$-$Al_2O_3$ | 2' | Ir | $0.5Na_2O.0.5H_2O$ ($0.2Co_2O_3.0.8Al_2O_3.0.25CaO$) |
| 3 | 1 | Pt | $\gamma$-$Al_2O_3$ | 3' | Ir | $0.5Na_2O.0.5H_2O$ ($0.2Ru_2O_3.0.8Al_2O_3.0.25CaO$) |
| 4 | 1 | Pt | $\gamma$-$Al_2O_3$ | 4' | Ir | $0.5Na_2O.0.5H_2O$ ($0.2Rh_2O_3.0.8Al_2O_3.0.25CaO$) |
| 5 | 1 | Pt | $\gamma$-$Al_2O_3$ | 5' | Ir | $0.5Na_2O.0.5H_2O$ ($0.2La_2O_3.0.8Al_2O_3.0.25CaO$) |
| 6 | 1 | Pt | $\gamma$-$Al_2O_3$ | 6' | Ir | $0.5Na_2O.0.5H_2O$ ($0.2Ce_2O_3.0.8Al_2O_3.0.25CaO$) |
| 7 | 1 | Pt | $\gamma$-$Al_2O_3$ | 7' | Ir | $0.5Na_2O.0.5H_2O$ ($0.2Ti_2O_3.0.8Al_2O_3.0.25CaO$) |
| 8 | 1 | Pt | $\gamma$-$Al_2O_3$ | 8' | Ir | $0.5Na_2O.0.5H_2O$ ($0.2V_2O_3.0.8Al_2O_3.0.25CaO$) |
| 9 | 1 | Pt | $\gamma$-$Al_2O_3$ | 9' | Ir | $0.5Na_2O.0.5H_2O$ ($0.2Cr_2O_3.0.8Al_2O_3.0.25CaO$) |
| 10 | 1 | Pt | $\gamma$-$Al_2O_3$ | 10' | Ir | $0.5Na_2O.0.5H_2O$ ($0.2Sb_2O_3.0.8Al_2O_3.0.25CaO$) |
| 11 | 1 | Pt | $\gamma$-$Al_2O_3$ | 11' | Ir | $0.5Na_2O.0.5H_2O$ ($0.2Ga_2O_3.0.8Al_2O_3.0.25CaO$) |
| 12 | 1 | Pt | $\gamma$-$Al_2O_3$ | 12' | Ir | $0.5Na_2O.0.5H_2O$ ($0.2Nb_2O_3.0.8Al_2O_3.0.25CaO$) |
| 13 | 1 | Pt | $\gamma$-$Al_2O_3$ | 13' | Ir | $0.5Na_2O.0.5H_2O$ ($0.2Fe_2O_3.0.8Al_2O_3.0.25MgO$) |
| 14 | 1 | Pt | $\gamma$-$Al_2O_3$ | 14' | Ir | $0.5Na_2O.0.5H_2O$ ($0.2Fe_2O_3.0.8Al_2O_3.0.25SrO$) |
| 15 | 1 | Pt | $\gamma$-$Al_2O_3$ | 15' | Ir | $0.5Na_2O.0.5H_2O$ ($0.2Fe_2O_3.0.8Al_2O_3.0.25BaO$) |
| 16 | 1 | Pt | $\gamma$-$Al_2O_3$ | 16' | Ir | $\gamma$-$Al_2O_3$ |
| 17 | 1 | Pt | $\gamma$-$Al_2O_3$ | 17' | Ir | $\theta$-$Al_2O_3$ |
| 18 | 1 | Pt | $\gamma$-$Al_2O_3$ | 18' | Ir | $SiO_2$ |
| 19 | 1 | Pt | $\gamma$-$Al_2O_3$ | 19' | Ir | $ZrO_2$ |
| 20 | 1 | Pt | $\gamma$-$Al_2O_3$ | 20' | Ir | $TiO_2$ |
| 21 | 1 | Pt | $\gamma$-$Al_2O_3$ | 21' | Ir | $Al_2O_3.ZrO_2$ (1:1) |
| 22 | 1 | Pt | $\gamma$-$Al_2O_3$ | 22' | Ir | $ZrO_2.TiO_2$ (1:1) |
| 23 | 1 | Pt | $\gamma$-$Al_2O_3$ | 23' | Ir | $Al_2O_3.TiO_2$ (1:1) |
| 24 | 1 | Pt | $\gamma$-$Al_2O_3$ | 24' | Ir | $SO_4/ZrO_2$ |
| 25 | 1 | Pt | $\gamma$-$Al_2O_3$ | 25' | Ir | Zeolite type Y |
| 26 | 1 | Pt | $\gamma$-$Al_2O_3$ | 26' | Ir | Silicalite |
| 27 | 1 | Pt | $\gamma$-$Al_2O_3$ | 27' | Ir | Zeolite type A |
| 28 | 1 | Pt | $\gamma$-$Al_2O_3$ | 28' | Ir | Mordenite |
| 29 | 2 | Rh | $\gamma$-$Al_2O_3$ | 1' | Ir | $0.5Na_2O.0.5H_2O$ ($0.2Fe_2O_3.0.8Al_2O_3.0.25CaO$) |

TABLE B-continued

| | 1st layer catalyst powder | | | 2nd layer catalyst powder | | |
|---|---|---|---|---|---|---|
| Honeycomb catalyst | No | Active metal | Carrier composition. | No | Active metal | Carrier composition |
| 30 | 3 | Pd | $\gamma$-$Al_2O_3$ | 1' | Ir | $0.5Na_2O.0.5H_2O$ ($0.2Fe_2O_3.0.8Al_2O_3.0.25CaO$) |
| 31 | 4 | Pt, Rh | $\gamma$-$Al_2O_3$ | 1' | Ir | $0.5Na_2O.0.5H_2O$ ($0.2Fe_2O_3.0.8Al_2O_3.0.25CaO$) |
| 32 | 5 | Pt, Pd | $\gamma$-$Al_2O_3$ | 1' | Ir | $0.5Na_2O.0.5H_2O$ ($0.2Fe_2O_3.0.8Al_2O_3.0.25CaO$) |
| 33 | 6 | Pt, Rh, Pd | $\gamma$-$Al_2O_3$ | 1' | Ir | $0.5Na_2O.0.5H_2O$ ($0.2Fe_2O_3.0.8Al_2O_3.0.25CaO$) |
| 34 | 7 | Pt | Similar as in 2nd layer support | 1' | Ir | $0.5Na_2O.0.5H_2O$ ($0.2Fe_2O_3.0.8Al_2O_3.0.25CaO$) |
| 35 | 1 | Pt | $\gamma$-$Al_2O_3$ | | | Similar to the left |

Honeycomb catalysts 1 to 35 obtained in Examples 1, 2, 3, 4 and 5 and Comparative 1 were examined for the activity. The results are shown below.

* Gas Composition

NO: 500 ppm, CO: 1000 ppm, $C_2H_4$: 1500 ppm, $O_2$: 8%, $CO_2$: 10%, $H_2O$: 10%, Balance: $N_2$, GHSV: 30000 $h^{-1}$, Catalyst dimension: 15 mm×15 mm×60 mm (144 cells)

The denitration rates of the catalysts in the initial state at the inlet gas temperatures of 250° C. and 350° C. are shown in Table C.

TABLE C

| | Inlet exhaust gas temperature: 250° C. | | Inlet exhaust gas temperature: 350° C. | |
|---|---|---|---|---|
| Honeycomb catalyst | Catalyst layer temperature (° C.) | NOx decomposition rate (%) | Catalyst layer temperature (° C.) | NOx decomposition rate (%) |
| 1 | 320 | 68 | 420 | 54 |
| 2 | 315 | 65 | 418 | 58 |
| 3 | 320 | 68 | 424 | 61 |
| 4 | 315 | 64 | 423 | 60 |
| 5 | 320 | 65 | 422 | 63 |
| 6 | 315 | 62 | 423 | 61 |
| 7 | 317 | 61 | 422 | 60 |
| 8 | 320 | 63 | 425 | 59 |
| 9 | 315 | 65 | 430 | 58 |
| 10 | 320 | 67 | 419 | 60 |
| 11 | 317 | 62 | 418 | 59 |
| 12 | 315 | 60 | 416 | 61 |
| 13 | 317 | 61 | 417 | 59 |
| 14 | 314 | 63 | 415 | 60 |
| 15 | 315 | 65 | 414 | 61 |
| 16 | 310 | 60 | 415 | 60 |
| 17 | 309 | 61 | 414 | 58 |
| 18 | 312 | 63 | 413 | 60 |
| 19 | 314 | 59 | 412 | 58 |
| 20 | 315 | 61 | 415 | 57 |
| 21 | 316 | 63 | 416 | 60 |
| 22 | 319 | 65 | 418 | 54 |
| 23 | 318 | 64 | 416 | 56 |
| 24 | 320 | 67 | 417 | 58 |
| 25 | 322 | 68 | 418 | 54 |
| 26 | 328 | 65 | 420 | 56 |
| 27 | 319 | 65 | 418 | 54 |
| 28 | 318 | 66 | 420 | 52 |
| 29 | 317 | 51 | 423 | 54 |
| 30 | 314 | 48 | 430 | 51 |
| 31 | 315 | 49 | 423 | 54 |
| 32 | 320 | 47 | 420 | 56 |
| 33 | 321 | 49 | 418 | 54 |
| 34 | 315 | 65 | 413 | 60 |
| 35 | 250 | 1 | 419 | 54 |

Honeycomb catalysts 1 to 34 according to the present invention shown in Table C had a sufficient denitration activity even at a low gas temperature of approximately 250° C., indicating that they can keep a high denitration activity over a wide range of temperatures. In contrast, a comparative catalyst 35 did not show an effective denitration activity at a low temperature of approximately 250° C.

Honeycomb catalysts 1 to 34 according to the present invention had stable activity in a reducing atmosphere also at a high temperature of approximately 700° C., thus ensuring high durability.

What is claimed is:

1. A process for the production of a multilayer catalyst for cleaning exhaust gases, comprising:

supporting a first catalyst layer on a support, said first catalyst layer having as an active metal at least one noble metal selected from the group consisting of platinum, rhodium and palladium, wherein the noble metal in the first catalyst layer is in a first carrier; and supporting a second catalyst layer consisting essentially of iridium as an active metal as an overlayer on the first catalyst layer to provide the multilayer catalyst capable of cleaning exhaust gases, wherein the iridium in the second catalyst layer is in a second carrier, said second carrier is a crystalline silicate which is represented by the following formula by molar ratio as dehydrated:

$$(1\pm 0.8)R_2O.[aM_2O_3.bM'O.cAl_2O_3].ySiO_2$$

wherein R denotes an alkali metal ion, a hydrogen ion, or a mixture of an alkali metal ion and a hydrogen ion, M denotes at least one elemental ion selected from the group consisting of iron, cobalt, ruthenium, rhodium, lanthanum, cerium, titanium, vanadium, chromium, antimony, gallium and niobium, M' denotes an alkaline earth metal ion of magnesium, calcium, strontium or barium, a>0, 20>b>0, a+c=1, and 3000>y>11.

2. The process of claim 1, wherein the first carrier is a crystalline silicate which is represented by the following formula by molar ratio as dehydrated:

$$(1\pm 0.8)R_2O.[aM_2O_3.bM'O.cAl_2O_3].ySiO_2$$

wherein R denotes an alkali metal ion, a hydrogen ion, or a mixture of an alkali metal ion and a hydrogen ion, M denotes at least one elemental ion selected from the group consisting of iron, cobalt, ruthenium, rhodium, lanthanum, cerium, titanium, vanadium, chromium, antimony, gallium and niobium, M' denotes an alkaline earth metal ion of magnesium, calcium, strontium or barium, a>O, 20>b>0, a+c=1, and 3000>y>11.

3. The process of claim 1, wherein the first carrier is γ-alumina.

4. The process of claim 1, wherein supporting the first catalyst layer comprises:

immersing the support in a slurry of the first catalyst, removing the support from the slurry of the first catalyst, and drying the support.

5. The process of claim 4, wherein the slurry of the first catalyst further comprises alumina and silica.

6. The process of claim 1, wherein supporting the second catalyst layer comprises:

immersing the support in a slurry of the second catalyst, removing the support from the slurry of the second catalyst, and drying the support.

7. The process of claim 6, wherein the slurry of the second catalyst further comprises alumina and silica.

8. The process of claim 1, further comprising:

immersing the first carrier in a first aqueous solution having at least one noble metal selected from the group consisting of platinum, rhodium and palladium, removing the first carrier from the first aqueous solution, drying the first carrier to dryness, and purging nitrogen over the dried first carrier.

9. The process of claim 8, wherein the nitrogen purging is carried out at a temperature of about 500° C.

10. The process of claim 1, further comprising:

immersing the second carrier in a second aqueous solution consisting essentially of iridium as an active metal, removing the second carrier from the second aqueous solution, drying the second carrier to dryness, and purging nitrogen over the dried second carrier.

11. The process of claim 10, wherein the nitrogen purging is carried out at a temperature of about 500° C.

12. The process of claim 1, further comprising:

subjecting the first carrier to ion exchange treatment, washing the first carrier, and sintering the first carrier.

13. The process of claim 12, wherein the sintering is carried out at a temperature of about 500° C.

14. The process of claim 1, further comprising:

subjecting the second carrier to ion exchange treatment, washing the second carrier, and sintering the second carrier.

15. The process of claim 1, wherein the process for making the crystalline silicate comprises:

dissolving water glass in water to yield solution A, dissolving (a) aluminum sulfate, (b) a first compound containing at least one elemental ion selected from the group consisting of iron, cobalt, ruthenium, rhodium, lanthanum, cerium, titanium, vanadium, chromium, antimony, gallium and niobium, (c) a second compound containing at least one alkaline earth metal ion selected from the group consisting of magnesium, calcium, strontium and barium and (d) sodium chloride in water to yield solution B, mixing solution A and solution B to yield an alkaline slurry, and sintering the alkaline slurry.

16. The process of claim 15, further comprising:

adding tetrapropyl ammonium bromide to the alkaline slurry to form a mixture, and subjecting the mixture to hydrothermal synthesis.

17. The process of claim 16, wherein the hydrothermal synthesis is carried out at a temperature of about 160° C.

18. The process of claim 15, wherein the sintering is carried out at a temperature of about 500° C.

19. The process of claim 1, further comprising:

subjecting the first carrier to impregnation treatment, washing the first carrier, and sintering the first carrier.

20. The process of claim 1, further comprising:

subjecting the second carrier to impregnation treatment, washing the second carrier, and sintering the second carrier.

21. A multilayer catalyst for cleaning exhaust gases comprising:

a first catalyst layer having as an active metal on a support at least one noble metal selected from the group consisting of platinum, rhodium and palladium, wherein the noble metal in the first catalyst layer is in a first carrier; and a second catalyst layer consisting essentially of iridium as an active metal as an overlayer on the first catalyst layer to provide the multilayer catalyst capable of cleaning exhaust gases, wherein the iridium in the second catalyst layer is in a second carrier, said second carrier is a crystalline silicate which is represented by the formula by molar ratio as dehydrated:

$(1\pm0.8)R_2O.[aM_2O_3.bM'O.cAl_2O_3].ySiO_2$ wherein R denotes an alkali metal ion, a hydrogen ion, or a mixture of an alkali metal ion and a hydrogen ion, M denotes at least one elemental ion selected from the group consisting of iron, cobalt, ruthenium, rhodium, lanthanum, cerium, titanium, vanadium, chromium, antimony, gallium and niobium, M' denotes an alkaline earth metal ion of magnesium, calcium, strontium or barium, a>0, 20>b>0, a+c=1, and 3000>y>11.

22. A multilayer catalyst according to claim 21 wherein the multilayer catalyst exhibits denitration performance at an exhaust gas temperature in the range of 200° C. to 400° C.

23. A multilayer catalyst according to claim 21, wherein the multilayer catalyst exhibits denitration performance at an exhaust gas temperature of 300° C.

24. A multilayer catalyst according to claim 21, wherein the multilayer catalyst exhibits denitration performance at an exhaust gas temperature of 250° C.

25. A multilayer catalyst according to claim 21, wherein the multilayer catalyst exhibits denitration performance at an exhaust gas temperature of 350° C.

26. A multilayer catalyst according to claim 21, wherein the multilayer catalyst exhibits stable performance for cleaning exhaust gases from a lean burn gasoline engine.

27. A multilayer catalyst according to claim 21, wherein the multilayer catalyst exhibits stable performance for cleaning exhaust gases from a diesel engine.

28. A multilayer catalyst according to claim 21, wherein the first carrier is a crystalline silicate which is represented by the following formula by molar ratio as dehydrated:

$(1\pm0.8)R_2O.[aM_2O_3.bM'O.cAl_2O_3].ySiO_2$ wherein R denotes an alkali metal ion, a hydrogen ion, or a mixture of an alkali metal ion and a hydrogen ion, M denotes at least one elemental ion selected from the group consisting of iron, cobalt, ruthenium, rhodium, lanthanum, cerium, titanium, vanadium, chromium, antimony, gallium and niobium, M' denotes an alkaline earth metal ion of magnesium, calcium, strontium or barium, a>0, 20>b>0, a+c=1, and 3000>y>11.

29. A multilayer catalyst according to claim 21, wherein the first carrier is γ-alumina.

30. A multilayer catalyst according to claim 21, wherein the thickness of the coating of the first catalyst layer is within the range from 1 to 300 μm.

31. A multilayer catalyst according to claim 21, wherein the thickness of the coating of the first catalyst layer is within the range from 5 to 100 μm.

32. A multilayer catalyst according to claim 21, wherein the thickness of the coating of the second catalyst layer is within the range from 1 to 300 μm.

33. A multilayer catalyst according to claim 21, wherein the thickness of the coating of the second catalyst layer is within the range from 3 to 200 μm.

34. A multilayer catalyst according to claim 21, wherein the first catalyst layer is coated in an amount of 0.05 to 5 gm per liter of the support.

35. A multilayer catalyst according to claim 21, wherein the second catalyst layer is coated in an amount of 0.03 to 10 gm per liter of the support.

36. A multilayer catalyst according to claim 21, wherein the first layer is below the second layer.

37. A multilayer catalyst according to claim 21, wherein the multilayer catalyst exhibits exhaust gas cleaning performance by at least one reaction selected from the group consisting of the reactions represented by the formulas $$C_3H_6 + 3/2O_2 \underset{k_1}{\rightarrow} 3CH_2O$$

$$CH_2O + O_2 \underset{k_2}{\rightarrow} CO_2 + H_2O$$

$$CH_2O + 2NO \underset{k_3}{\rightarrow} N_2 + CO_2 + H_2O$$

and $$CO + 1/2O_2 \underset{k_4}{\rightarrow} CO_2$$

38. A multilayer catalyst according to claim 21, wherein the multilayer catalyst exhibits exhaust gas cleaning performance by at least one reaction selected from the group consisting of (a) activation of hydrocarbon, (b) burning of hydrocarbon, (c) denitration, and (d) burning of carbon monoxide.

* * * * *